United States Patent

Rugraff

[11] Patent Number: 5,115,693
[45] Date of Patent: May 26, 1992

[54] TRANSMISSIONS OF VEHICLES EQUIPPED WITH ELECTRIC RETARDERS

[75] Inventor: Guy Rugraff, Pantin, France
[73] Assignee: Labavia - S.G.E., France
[21] Appl. No.: 595,851
[22] Filed: Oct. 11, 1990
[30] Foreign Application Priority Data
   Oct. 17, 1989 [FR] France .................. 89 13560
[51] Int. Cl.⁵ .............. F16H 57/02; H02K 49/04; F16D 3/16
[52] U.S. Cl. ................. 74/606 R; 310/105; 310/93; 464/136
[58] Field of Search ............ 74/606 R; 310/105, 106, 310/92, 93; 464/29, 136, 180, 106
[56] References Cited

U.S. PATENT DOCUMENTS

| | | | |
|---|---|---|---|
| 1,746,325 | 2/1930 | Thomas | 464/132 X |
| 1,908,086 | 5/1933 | Urch | 464/136 X |
| 3,545,232 | 12/1968 | Neese et al. | 464/134 X |
| 3,908,141 | 9/1975 | Lemonnier | 310/105 X |
| 4,128,147 | 12/1978 | Lafuente Ruberte | 310/93 X |
| 4,491,755 | 1/1985 | Bertrand | 310/93 O |
| 4,548,591 | 10/1985 | Haldric et al. | 464/180 X |
| 4,864,173 | 9/1989 | Even | 310/105 X |

Primary Examiner—Rodney H. Bonck
Assistant Examiner—Winnie Yip
Attorney, Agent, or Firm—Larson and Taylor

[57] ABSTRACT

To reduce as much as possible the extension of a vehicle transmisson due to the cantilever fitting of an electric retarder with two rotor discs and two rotor rings on the casing of the gearbox of this transmission, between the gearbox flange and the journal cross of the nearest cardan joint a single tubular insert is provided bearing the two rings externally and pierced radially with two bores forming bearings for two journals of the journal cross with interpositioning of bushings and by two apertures adapted to let pass bushings associated with the other two journals of the journal cross for pivotally mounting same on the fork of the cardan joint.

5 Claims, 2 Drawing Sheets

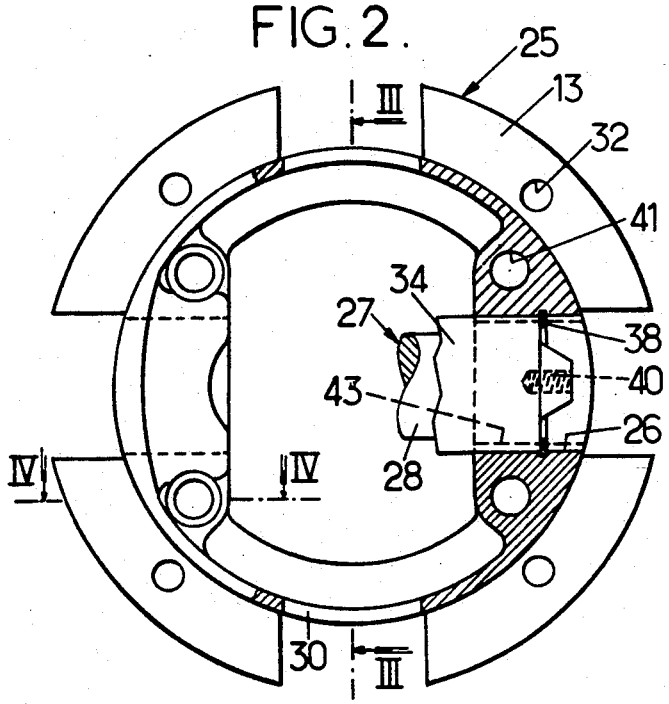
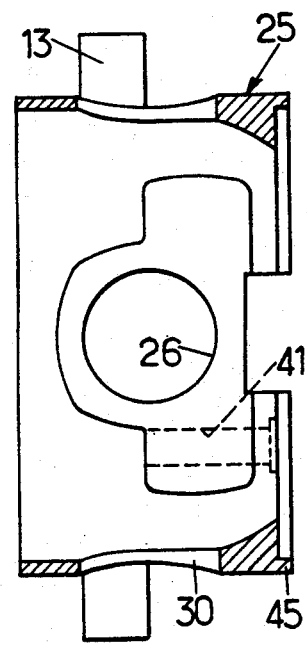
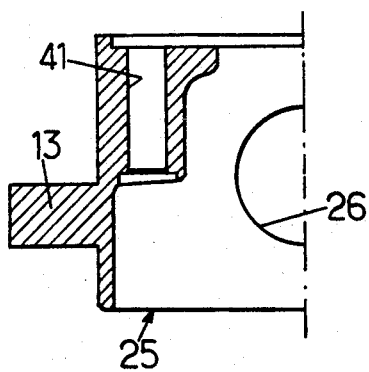
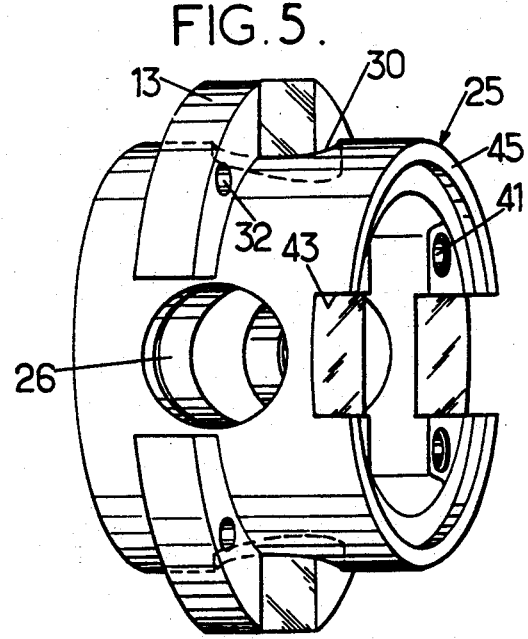

TRANSMISSIONS OF VEHICLES EQUIPPED WITH ELECTRIC RETARDERS

BACKGROUND OF THE INVENTION

The invention relates to vehicle transmissions, namely chains of members transmitting the rotational movement of the engine to the wheels of the vehicle, which members comprise a gearbox, a rear axle and a double jointed cardan shaft transferring the torque from the gearbox to the rear axle while permitting relative transverse movements thereof.

It relates more particularly, among such transmissions, to those equipped with an electric eddy current retarder adapted to exert thereon a braking torque at the desired times, said retarder comprising, on the one hand, an annular inductor stator cantilevered on the gearbox casing of the vehicle by means of an appropriate frame and, on the other hand, a rotor comprising two armature discs made from a ferromagnetic material which surround the stator and are both supported by a part itself cantilevered on a stub shaft inside the casing, each disc being fixed for this purpose, via a circle of arms forming ventilation fins, with a ring which is in its turn fixed to said part.

In known embodiments of transmissions of the kind in question, the part on which the two rings are mounted is generally a special insert plate which is fixed, on the one hand, on a "gearbox flange" fixed on a stub shaft inside the casing of the gearbox and, on the other hand, on the axial side opposite said sub shaft, on an end flange of the adjacent cardan joint.

It should in fact be noted that it is not in practice possible to mount the rotor rings directly on the gearbox flange, for fitting of at least the ring disposed on the gearbox side would then have to be done before the flange is positioned on the gearbox.

Now, such positioning consists in forced axial fitting together of complementary splines provided respectively on the stub shaft inside the gearbox and on a cylindrical sleeve extending the flange such force fitting can only be carried out with the flange off load.

The special insert plate must have a certain thickness since it is to transmit the whole of the engine torque of the vehicle from the cardan joint to the gearbox flange.

Thus, it has the double drawback of a respectively high weight and axial size.

This latter drawback may be serious in the case of very short transmissions, namely in which a limited space is available between the output of the gearbox and the input of the rear axle.

This is in particular the case for certain modern rear-engined buses, in which the overall length of the engine-gearbox assembly and that of the rear axle, particularly of the hypoid type, increase without the respective positions of these members being modified.

In such a case, it is sometimes very precious to be able to reduce, even by a few centimetres only, the extension of the transmission due to the fitting of an electric retarder of the above kind thereon, the possibility of fitting such a retarder being sometimes related directly to such a reduction.

To reduce the extension mentioned, it has already been proposed by the Applicant U.S. Pat. No. 5,044,228 to enlarge the gearbox flange transversely and to fix the rotor rings of the retarder on the periphery of this enlarged flange via a tubular insert extending axially from this periphery on the side opposite the gearbox.

The end flange of the cardan joint considered is then fixed directly to the gearbox flange, inside said tubular insert.

Such a construction is advantageous, in particular because the insert, which only has to transmit retarding torques and not drive torques, may be formed by a very light part, comprising essentially a tube section reinforced by internal radial ribs.

But it pre-supposes that the opening freed in the centre of the retarder has a large diameter, this opening having to be sufficient to receive concentrically the tubular insert and, thereinside, the flange of the cardan joint.

SUMMARY OF THE INVENTION

The present invention proposes a solution which makes it possible to shorten the transmission as in the preceding case and which is applicable even to retarders in which the diameter of the central opening is relatively small, which is the case for most of the presently existing retarders of the kind considered.

For this, transmissions of the kind in question according to the invention are essentially characterized in that they comprise, between the gearbox flange and the journal cross of the nearest cardan joint, a single tubular insert fixed to the periphery of said gearbox flange on the side opposite the gearbox, this insert comprising external radial lugs on which the two rotor rings of the retarder are fixed axially and being formed radially, on the one hand, with two coaxial bores forming bearings for two of the journals of the above journal cross with interpositioning of appropriate bushings and, on the other hand, with two coaxial apertures whose axis is perpendicular to that of the two bearings, which apertures are adapted to let pass the bushings which are associated with the other two journals of the journal cross for pivotally mounting same in the corresponding fork of the cardan joint.

In preferred embodiments, recourse is further had to one and/or other of the following arrangements :
the axial end face, of the tubular insert, intended to be applied against the gearbox flange, comprises, on the one hand, flat transverse zones adapted to be applied jointingly against opposite zones of said flange and, on the other hand, stops with longitudinal sides (rectangular recesses or parallelepipedic shoes) adapted to cooperate jointingly with complementary stops with longitudinal sides (shoes or recesses) of this flange,
one of the two parts formed respectively by the gearbox flange and by the tubular insert comprises an annular heel adapted to jointingly cover an annular bearing surface of the other part along a cylindrical contact surface of revolution,
the bushings are in the form of cylindrical pots whose internal lateral wall is lined with longitudinal needles and the bottom of which is formed externally with a threaded hole or similar for fixing an axial extraction tool.

BRIEF DESCRIPTION OF THE DRAWINGS

Apart from these main arrangements, the invention comprises certain other arrangements which are preferably used at the same time and which will be more explicitly discussed hereafter. In what follows, a preferred embodiment of the invention will be described with reference to the accompanying drawings in a way which is of course in no wise limitative.

FIG. 2 shows in top plan view an insert according to the invention which is part of the vehicle transmission of FIG. 1;

FIG. 3 is an axial sectional view taken along line III—III of FIG. 2;

FIG. 4 is a partial longitudinal sectional view taken along line IV—IV of FIG. 2; and FIG. 5 is perspective view of the insert of FIG. 3.

DETAILED DESCRIPTION OF THE INVENTION

Figure 1:
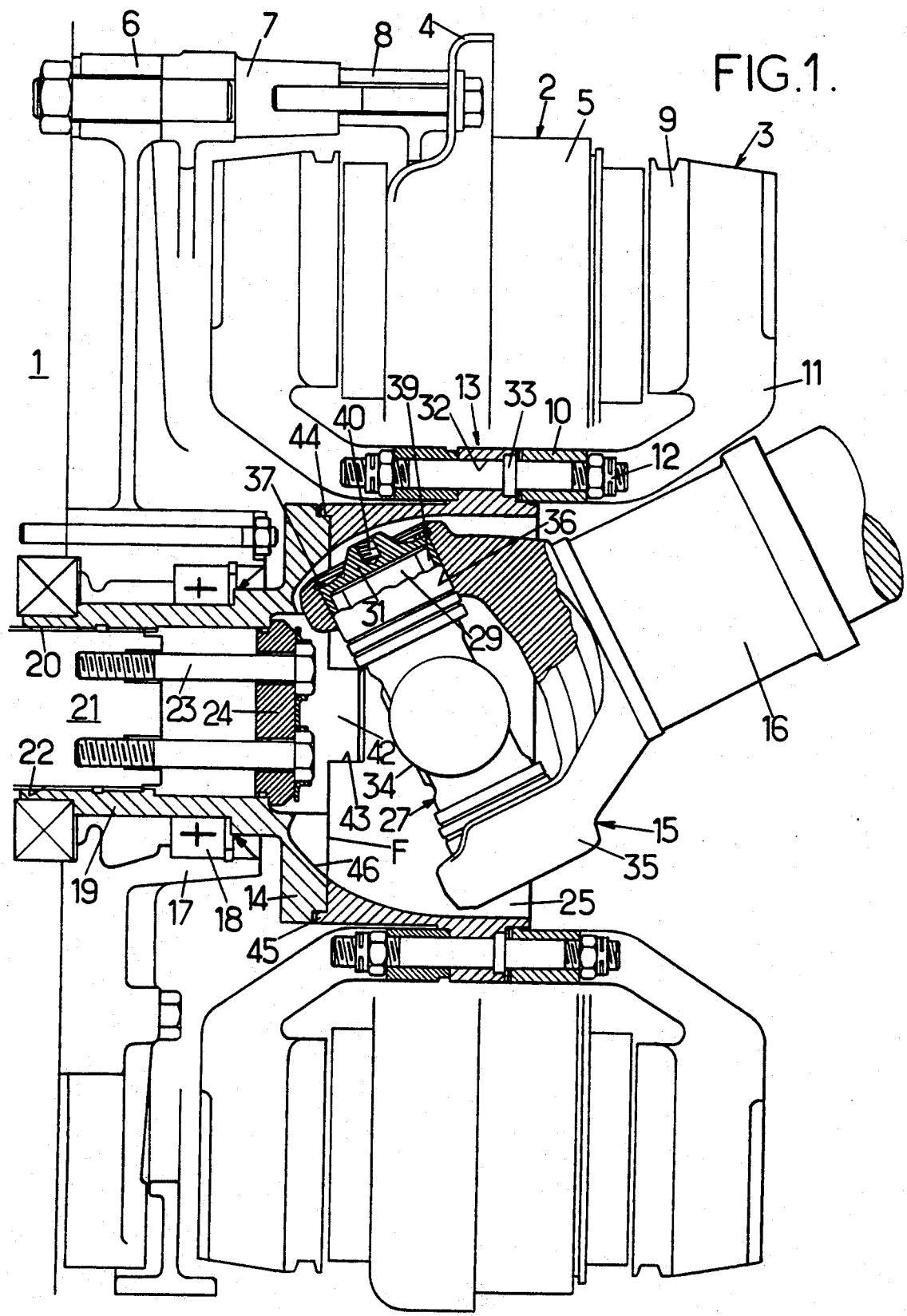
FIG. 1 of these drawings shows in axial section a part of a vehicle transmission equipped with an electric retarder in accordance with the invention.

The electric retarder considered is of the type — known under the trademark "FOCAL"— cantilevered, with a horizontal or substantially horizontal axis, on the output of a gearbox casing 1.

This retarder comprises an inductor stator 2 and an induced rotor 3.

The stator 2 comprises a substantially annular flange 4 which carries a circle of coils 5, even in number, arranged so as to form by their ends two annular series of flat magnetic poles with alternating polarities.

Flange 4 is mounted on the gearbox casing 1 — or more precisely on an intermediate mount 6 itself fixed against the flat front face of said casing 1 — via a structure 7 in the form of a star or apertured bell and tubular spacers 8.

Rotor 3 comprises two ferromagnetic material discs 9 adapted to surround the stator axially and to each travel opposite a series of poles of this stator from which they are separated by a small clearance or air gap.

Each disc 9 is connected to a fixing ring 10 by a circle of curved arms 11 forming ventilation fins and the two rings 10 are bolted by bolt-nut systems 12 to an intermediate annulus 13 which will be described further on.

The problem to be solved is the fitting of this annulus 13 on a "gearbox flange" 14 defined as follows while making it possible to couple on the same flange one of the two cardan joints 15 of the double jointed cardan shaft 16, which joint is placed inside said annulus 13.

The central portion of the gearbox mount 6 is in the form of a cylindrical nose 17 carrying, via an end bearing 18, a sleeve 19 the external axial end of which is extended radially by flange 14 called in the present text "gearbox flange".

The other axial end of sleeve 19 is splined inwardly at 20 and is force fitted on the end piece 21 of the gearbox, splined externally at 22.

This fitting together is done by force so as to avoid any creation of play and it is then held by screwing axially into end piece 21 screws 23 whose heads are applied against a plate 24 itself bearing on sleeve 19.

As mentioned above, it is on the gearbox flange 14 thus defined that it is proposed to fit the above annulus 13 and a cardan joint 15.

To shorten the transmission as much as possible because of the above mentioned requirements, the axial lengths of nose 17 and sleeve 19 are relatively small and flange 14 extends close to the axial end of said nose 17.

Thus, and since the two rotor rings 9-12 are identical and therefore have the same dimension, there would not be sufficient room in the annular hollow of structure 7 to house therein the ring the closest to the gearbox if annulus 13 merged with the periphery of flange 14.

Another reason why such a solution cannot be envisaged resides in the requirements of force fitting since, as mentioned above, it would then be necessary to fit the internal rotor ring on the flange before mounting this flange on the gearbox.

It is to overcome such difficulties that recourse is generally had to an insert plate fixed externally on the gearbox flange 14, the periphery of this insert plate then forming annulus 13 and the end flange of the cardan joint 15 being then fixed to said insert plate.

According to the invention, this insert plate, which is particularly heavy and cumbersome, is omitted and the whole of said plate and the usual end cardan flange is replaced by a single tubular insert or sleeve 25.

In other words, the above annulus 13 forms part of this sleeve 25 and said sleeve 25 comprises two bores 26 themselves serving as bearings for two journals of the journal cross 27 included in joint 15, which journals are designated by a reference 28 whereas the other two journals are designated by the reference 29.

Furthermore, two coaxial apertures 30 are formed radially in sleeve 25, whose common axis is perpendicular to that of the two bearings 26, which apertures are adapted to let pass special mounting bushings 31 for the two journals 29 of the journal cross.

As can be seen in FIGS. 2, 3 and 5, since the bearings 26 and apertures 30 pass through sleeve 25 radially from one side to the other and since they are situated at the level of the outer annulus 13, the latter is interrupted at the level of these bearings and apertures and is finally formed by four lugs.

Each of these lugs is formed with at least one bore 32 adapted to receive a bolt 12 for fixing the rotor rings 10, one end of this bore 32 being formed as a rectangle adapted to jointingly receive a square section 33 (FIG. 1) of said bolt 12 for angularly blocking same.

To clarify the drawings, the portion of annulus 13, which has been shown in FIG. 1, has been assumed offset angularly about its axis with respect to reality so as to show the bolt-nut systems 12 in the place of bores 30 which would alone have been visible because of the way in which the journal cross 27 has been shown in FIG. 1.

The four bores (bearings 26 and apertures 30) made radially through and through in sleeve 25 make it possible to fit four special bushings — namely the two above bushings 31 associated with the two journals 29 of the journal cross 27 and two other similar bushings 34 associated with the two other journals 28 of the journal cross 27 — after floating positioning of this journal cross in the fork 35 of joint 15 and positioning of this fork with its floating journal cross in sleeve 25.

In fact, each of these positioning operations may be carried out despite the relatively small opening of the fork and despite the relatively small internal diameter of sleeve 25 — itself due to the relatively small internal diameter of the rotor rings 10 — because of the clearances then provided between the journals and their housings, which makes it possible to present the journal cross slantwise for said positioning operations.

Each special bushing 31, 34 has the general form of a cylindrical pot which can be fitted jointingly in the corresponding bearing 36 (FIG. 1) of fork 35 or 26 (FIG. 2) of sleeve 25, its axial end of travel position in this bearing being maintained by fitting a circlip 37, 38 in a complementary groove formed in said bearing.

The inner wall of each bushing is lined with needles or rollers, as can be seen at 39 in FIG. 1.

The bottom of each bushing 31, 34 is pierced externally at its centre by a threaded hole 40 facilitating its axial extraction, after removal of the corresponding circlip from its groove, making it possible to engage an extraction tool by screwing this tool in said hole.

To fix sleeve 25 on the gearbox flange 14, four screws (not shown) are used passing through cylindrical bores 41 formed in extra thick portions of the sleeve provided on each side of each bearing 26, these screws being screwed into threaded holes (not shown) in the flange.

During such screwing, a flat transverse face of the sleeve is applied directly against a flat transverse face F of the flange, which exactly defines the air gaps of the retarder.

The transfer of the torques applied to the transmission shaft between the two parts 14 and 25 is advantageously effected by jointingly covering the parallelepipedic shoes or blocks 42 forming part of flange 14 by complementary recesses 43 formed in the skirt of sleeve 25.

As for the relative centering between flange 14 and sleeve 25 with respect to the axis of revolution common to these two parts, it is obtained by jointingly covering a cylindrical surface of revolution 44 defining the periphery of the flange by a cylindrical edge of revolution 45 forming part of the sleeve.

To fit a transmission of the above described kind, the following is the procedure.

The gearbox 1 is assumed initially equipped with its flange 14.

Then the cardan joint 15 is mounted in the insert sleeve 25 by introducing successively its journal cross 27 in fork 35, from which the bushings 31 have been removed, then said fork equipped with the journal cross still floating in sleeve 25, from which the bushings 34 have been removed.

As mentioned above, it is the considerable play due to the absence of bushings which makes it possible to present the journal cross slantwise which is made necessary by said introductions.

After such introductions, the fitting of the different journals in their bearings is completed by covering them axially by the corresponding bushings, through the appropriate openings 26, 30 in the sleeve, then positioning the circlips 37, 38 in the corresponding grooves.

Then the rotor 3 of the retarder is fitted on annulus 13 and more exactly on the four lugs which form this annulus by means of bolt-nut systems 12 and finally the sleeve 25 fitted internally with the cardan joint 15 and externally with the rotor 3 of the retarder is mounted on the gearbox flange 14 by first of all bringing these two parts together with axial overlapping, on the one hand, of shoes 42 by the sides of recesses 43 and, on the other hand, of the cylindrical bearing surface 44 by the cylindrical edge 45, then screwing into the threaded holes of the flange the fixing screws housed in bores 41.

Removal of the transmission takes place very simply by the succession of operations in the reverse direction, each bushing being released by means of an extractor screwed into the threaded hole 40 of this bushing.

Cavities 46 can be further seen in FIG. 1 in the external front face of the gearbox flange 14 which cavities are intended to receive the arms of fork 35 when the axis of the cardan shaft 16 is greatly slanted with respect to that of said flange, as is the case for FIG. 1.

Following which and whatever the embodiment adopted, a vehicle transmission is finally obtained equipped with a "FOCAL" type electric retarder, whose construction and fitting are sufficiently clear from the foregoing.

This transmission has the double advantage :
of being extremely short, the axial distance between the centre of the journal cross and the front face F of the insert sleeve 25 applied on the gearbox flange 14 being as small as 50 mm for an electric retarder whose external diameter is about 500 mm,
and of being able to be used with an electric retarder of a presently existing type, i.e. having a relatively narrow central opening, the inner diameter of the rotor rings 10 being as small as 180 mm.

The very small number of fixing means required will also be noted.

In fact, apart from the bolt-nut systems 12 provided as usual for fixing the two rotor rings 10 on annulus 13 here discontinuous, the only fixing means required are the four screws housed in the bores 41 of the insert sleeve 25 in particular, the proposed construction comprises less screwing members than that mentioned above in which the rotor rings are fixed on a tubular insert itself fixed to the enlarged periphery of the gearbox flange and in which the cardan joint comprises a normal end flange fixed directly to said gearbox flange.

As is evident, and as it follows from what has gone before, the invention is in no wise limited to those of its modes of application and embodiments which have been more especially considered; it embraces, on the contrary, all variants thereof, particularly those in which the transfer of the torques between the gearbox flange 14 and sleeve 25 is provided by complementary teeth formed respectively on these two parts, or else by simple screws or bolts whose diameter and/or numbers are increased with respect to those of the above described embodiment.

I claim:
1. A vehicle transmission comprising:
a gearbox;
a rear axle;
a double jointed cardan joint which connects said gearbox and said rear axle;
an electric eddy current retarder including an annular inductor stator cantilevered on said gearbox by a frame and a rotor having two armature discs made of a ferromagnetic material, said armature discs surrounding said stator and being supported by a gearbox flange, said gearbox flange being cantilevered on a stub shaft inside said gearbox, each said armature disc being fixed to a bent arm and said bent arm being fixed to one of two rotor rings, said two rotor rings being fixed to said gearbox flange;
a tubular insert through which a journal cross of said cardan joint extends, said journal cross being mounted in a fork of said cardan joint, said tubular insert being fixed to a peripheral portion of said gearbox flange on a side of said gearbox flange opposite said gearbox, said tubular insert including radial lugs to which are fixed said two rotor rings, two coaxial bores for acting as bearings for two first journals of said journal cross, each of said coaxial bores being mounted therein bushings for said two first journals, and said insert further including two coaxial apertures which allow bushings for two second journals transverse of said first journals of said journal cross to be mounted in bearings of said fork.

2. A vehicle transmission according to claim 1, wherein said tubular insert includes an axial end face having flat transverse zones for abutting against flat transverse zones on said gearbox flange and includes recesses for receiving blocks on said flange.

3. A vehicle transmission according to claim 1, wherein one of the two parts forming said gearbox flange and said tubular insert includes an annular heel for engaging a bearing surface on the other part along a cylindrical contact surface of revolution.

4. A vehicle transmission according to claim 1, wherein said bushings include an axial hole for engaging an axial extraction tool.

5. A vehicle transmission according to claim 4, wherein said axial hole is threaded.

* * * * *